United States Patent
Acharya et al.

(10) Patent No.: US 7,509,398 B2
(45) Date of Patent: Mar. 24, 2009

(54) SYSTEM AND METHOD FOR PROTOCOL INDEPENDENT ACCESS AND INVOCATION OF WEB SERVICES

(75) Inventors: Amit Praveen Acharya, Morrisville, NC (US); Lawrence Scott Rich, Cary, NC (US); Monica S. Tamboli, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 10/905,621

(22) Filed: Jan. 13, 2005

(65) Prior Publication Data

US 2006/0168122 A1 Jul. 27, 2006

(51) Int. Cl.
G06F 15/16 (2006.01)
G06F 9/45 (2006.01)

(52) U.S. Cl. .................. 709/219; 717/140
(58) Field of Classification Search .......... 709/217, 709/219, 223
See application file for complete search history.

(56) References Cited

U.S. PATENT DOCUMENTS

| | | | | |
|---|---|---|---|---|
| 2001/0010053 | A1 | 7/2001 | Beb-Shachar et al. | 709/105 |
| 2002/0099738 | A1 | 7/2002 | Grant | 707/513 |
| 2003/0070006 | A1* | 4/2003 | Nadler et al. | 709/330 |
| 2003/0093500 | A1 | 5/2003 | Khodabakchian | 709/219 |
| 2003/0110242 | A1 | 6/2003 | Brown et al. | 709/222 |
| 2003/0204622 | A1 | 10/2003 | Blizniak et al. | 709/241 |
| 2004/0003033 | A1* | 1/2004 | Kamen et al. | 709/203 |
| 2004/0019696 | A1 | 1/2004 | Scott et al. | 709/242 |
| 2004/0030627 | A1 | 2/2004 | Sedukhin | 705/36 |
| 2004/0030740 | A1 | 2/2004 | Stelting | 709/201 |
| 2004/0064505 | A1 | 4/2004 | Harti | 709/204 |
| 2004/0078424 | A1* | 4/2004 | Yairi et al. | 709/203 |
| 2004/0111506 | A1 | 6/2004 | Kundu et al. | 709/223 |
| 2004/0111525 | A1 | 6/2004 | Berkland et al. | 709/231 |
| 2004/0221017 | A1* | 11/2004 | Yoon | 709/217 |
| 2006/0179150 | A1* | 8/2006 | Farley et al. | 709/228 |
| 2007/0005777 | A1* | 1/2007 | Fremantle et al. | 709/228 |

* cited by examiner

*Primary Examiner*—Joseph E Avellino
*Assistant Examiner*—Shaq Taha
(74) *Attorney, Agent, or Firm*—Yee & Associates, P.C.; Bruce Clay

(57) ABSTRACT

Middleware application for managing communication between a client and a web service so that changes in the web service information, such as a change in the web service location, are addressed by the middleware application is disclosed. A developer registers web services in a repository. The middleware application generates a web service proxy based on web service information entered in the repository, and generates a new web service proxy when the web service information changes. The developer can then write code for client applications without the need to change code when changes are made in the web service information. Responsive to a client request, the middleware application accesses the repository to match the request with a web service. The middleware application transmits the request through the web service proxy to the web service. The method for using the middleware application comprises entering web service information in a repository, generating a web service proxy for a web service registered in the repository, and storing the web service proxy, so that changes in web service information, such as the web service location, will cause a new web service proxy to be generated.

1 Claim, 8 Drawing Sheets

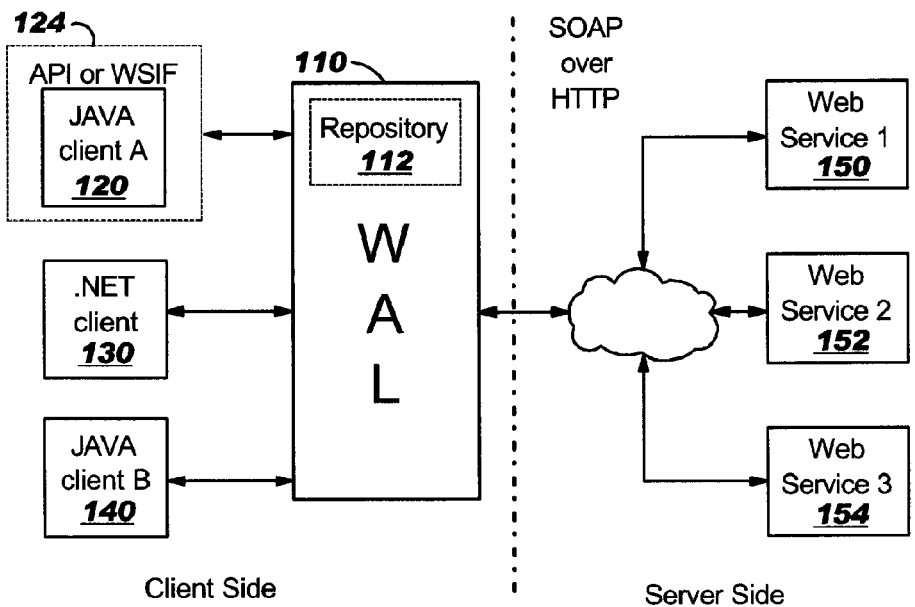

| WIP 600 | Repository 112 |
| SRP 700 | PGT 310 |
| CDP 800 | JAR 320 |
| SIP 900 | WWS 340 |
| OS 360 | |
| WALP 500 | |

SYSTEM AND METHOD FOR PROTOCOL INDEPENDENT ACCESS AND INVOCATION OF WEB SERVICES

FIELD OF THE INVENTION

The present invention relates generally to electrical and digital data processing systems for the transfer and use of web services between users of the Internet or an intranet. In particular, the invention pertains to a middleware application that allows the development of web service client code independent of the web service location or protocol used to implement the web service.

BACKGROUND OF THE INVENTION

In recent history, the World Wide Web (the "Web") has served two primary roles. First, the Web has provided a mechanism for communication among individuals and businesses, allowing these entities to exchange messages instantaneously. Second, the Web has served as a global library, providing a mechanism for the retrieval and dissemination of information. Today, however, the Web is increasingly used to communicate information from one programming application to another programming application without human intervention, through the use of web services.

A web service is a programming module, located on the Internet that is available for remote invocation. When invoked, the web service implements programming logic and provides functionality for disparate applications across application and organization boundaries. Businesses and other organizations use web services to exchange data with customers over the Internet and between users over an intranet. For example, an e-business wholesaler may use a web service that distributes a list of products to retailers. That e-business wholesaler also would use a web service that receives a purchase order from a retailer and then returns that order with expected shipment dates, the cost of shipping, handling, and the tax on the products. Additionally, a business may use a web service internally over an intranet to exchange data within divisions, such as when a paycheck is calculated using various payroll applications internal to the organization.

A web service client ("client") is the programming application that invokes the web service. In order for a client to invoke a web service, a message must be sent. Messages are sent based upon protocols developed to promote interoperability among clients and web services. Internet web services are built upon standards and protocols, such as Extensible Mark-up Language (XML), Simple Object Access Protocol (SOAP), and Hypertext Transfer Protocol (HTTP), which have been developed by the World Wide Web Consortium (W3C). XML is a simple, flexible text format for defining data elements in a document. XML has become the dominant message format supporting business-to-business transactions. XML messages often include SOAP elements. When an XML message includes SOAP elements, the XML message is said to be contained within a SOAP "wrapper." SOAP is a message-based protocol, built around XML, for accessing services on the Internet. SOAP employs XML syntax to send text commands across the Internet using HTTP. HTTP is a standard protocol for communication of messages across the Internet and uses a request/response paradigm. Using HTTP, an XML message sent across the Internet to a web service for processing is a "message request." After processing the XML message, the web service returns another XML document as a "message response."

In addition to the protocols discussed above, another element necessary for a client to invoke a web service is access to the appropriate Web Services Description Language (WSDL) document. The WSDL document format is also based on XML. WSDL is required by a web service to describe the capabilities of the web service. Additionally, the WSDL document specifies the web service's location on the Internet and the protocols that clients can use to communicate with the web service. Therefore, in order to invoke a web service, a client needs a proper protocol and the web service location from the appropriate WSDL document.

Each web service has unique requirements that are described in the WSDL document, which are necessary for the client to communicate with the web service. With any web service, the client does not need to know the language in which the web service is implemented. In fact, both the client and the web service are unaware of the other's implementation details. Instead, the client needs only to know the location of the web service, the methods that the client can call on the service, and the message, i.e., data, required to invoke the method. A method is a unique name for a programming task supported by the web service. In the above e-business example, data required to invoke a method to calculate the cost of purchasing and shipping a product may include the type of product and quantity.

Traditionally, a developer programs client code, providing the data required for invoking a method as specified in the WSDL document. In addition to the protocol and the web service location, a proxy is also necessary in order to invoke the method. When a web service is available for use on the Internet, the methods that a client can invoke are said to be "exposed" and available for "consumption" by the web service. A proxy is a programming component that exposes the methods available from the web service to the web service client.

The proxy is included in the client program and is a tool for sending messages from the client to the web service. If the proxy is generated and compiled into the client program at the time of development, the proxy is said to be a static proxy. If the web server provider changes the web service location or otherwise modifies the WSDL document after client code has been developed, the developer must then generate a new static proxy based on the modified WSDL document. Furthermore, the developer must recompile the client code to use the new static proxy and invoke the web service whose location has changed.

To minimize the need to recompile client code, an application may use a dynamic proxy to invoke a web service. A dynamic proxy is a proxy that is created at runtime by passing the Uniform Resource Identifier (URI) of the WSDL document for the web service to an Application Programming Interface (API), such as JAX-RPC, or a Web Services Invocation Framework (WSIF), such as in Apache-Axis WSIF. JAX-RPC is a key JAVA library that enables web services interoperability. Using an API such as JAVA's JAX-RPC, the developer utilizes the WSDL document provided by the web service to generate a web service proxy. Since the actual web service proxy used for invoking the web service is generated dynamically at runtime, instead of during development, the developer does not need to recompile the client code if the WSDL document changes.

WSIF is a JAVA-based framework that also supports communication between a client and web service. WSIF was developed by IBM, Inc. and donated to the Apache Axis foundation as open source code. WSIF is similar to JAX-RPC in that it also supports dynamic invocation of a web service by generating the proxy at runtime so that client code does not need to be recompiled if the web service location changes after development. Although JAX-RPC and WSIF minimize the need to recompile client code by dynamically generating a proxy at runtime to invoke a web service, support is limited to JAVA clients. In contrast to JAVA clients, .Net clients use C#, J#, J script.NET, or VB.Net programming languages. Consequently, the available JAVA API's do not support .Net clients and cannot dynamically invoke a web service for a .Net client at runtime. Moreover, JAX-RPC, WSIF, and other dynamic invocation methods are inherently more difficult to program. For example, the code does the work of a proxy, and therefore, more work must be performed at run time and invocation takes longer. Moreover, clients that rely on them are still susceptible to other maintenance problems, including deprecated APIs and protocols.

U.S. Patent Application 2004/0019696 (the '696 application) discloses a broad method for discovering applications on a network for internal integration of the applications, for associating the applications, and for providing a method of routing information between the applications. The '696 patent application discloses the use of a central repository for application information and web services as a type of application. The '696 application though, does not address applications in an Internet environment and does not address the invocation of web services.

U.S. Patent Application 2004/0111525 (the '525 application) discloses an enhanced service factory as an extension of IBM's Web Service Invocation Framework (WSIF). The enhanced service factory performs dynamic discovery and selection of web service implementations at runtime. The enhanced service factory uses service and port-type information, from a WSDL document, to query the URI and discover candidate web services for that port type. Once a list of the candidate web services is compiled, a particular web service is selected from the list. Selection is based on criteria located in a configuration file. The enhanced service factory generates a proxy for the selected candidate at run time. If the criteria for candidate selection changes, the enhanced service factory generates a new proxy at runtime for that candidate. The '525 application does not disclose calling a web service.

Therefore, a need exists for a middleware application that manages communication between a client and a web service so that changes affecting communication between the client and the web service, including web service relocation, API deprecation, technological changes, or protocol changes, are addressed by the middleware application without a requirement to write new client code.

SUMMARY OF THE INVENTION

The invention that meets the needs described above is a middleware application for managing communication between a client and a web service so that changes affecting such communication, including web service relocation, deprecated APIs, or protocol changes, are addressed by the middleware application. A developer registers web services in a repository. The middleware application generates a web service proxy based on web service information entered in the repository, and generates a new web service proxy when the web service information changes. The developer can then write code for client applications without the need to change code when changes are made in the web service information. Responsive to a client request, the middleware application accesses the repository to match the request with a web service. The middleware application transmits the request through the web service proxy to the web service. The method for using the middleware application comprises entering web service information in a repository, generating a web service proxy for a web service registered in the repository, and storing the web service proxy, so that changes in web service information, such as the web service location, will cause a new web service proxy to be generated.

These and other objects of the invention will be apparent to those skilled in the art from the following detailed description of a preferred embodiment of the invention.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 1 depicts an overview of the Web Abstraction Layer (WAL) configured in an exemplary system;

FIG. 2 depicts the format of the central repository;

DETAILED DESCRIPTION OF THE PREFERRED EMBODIMENT

Figure 3:
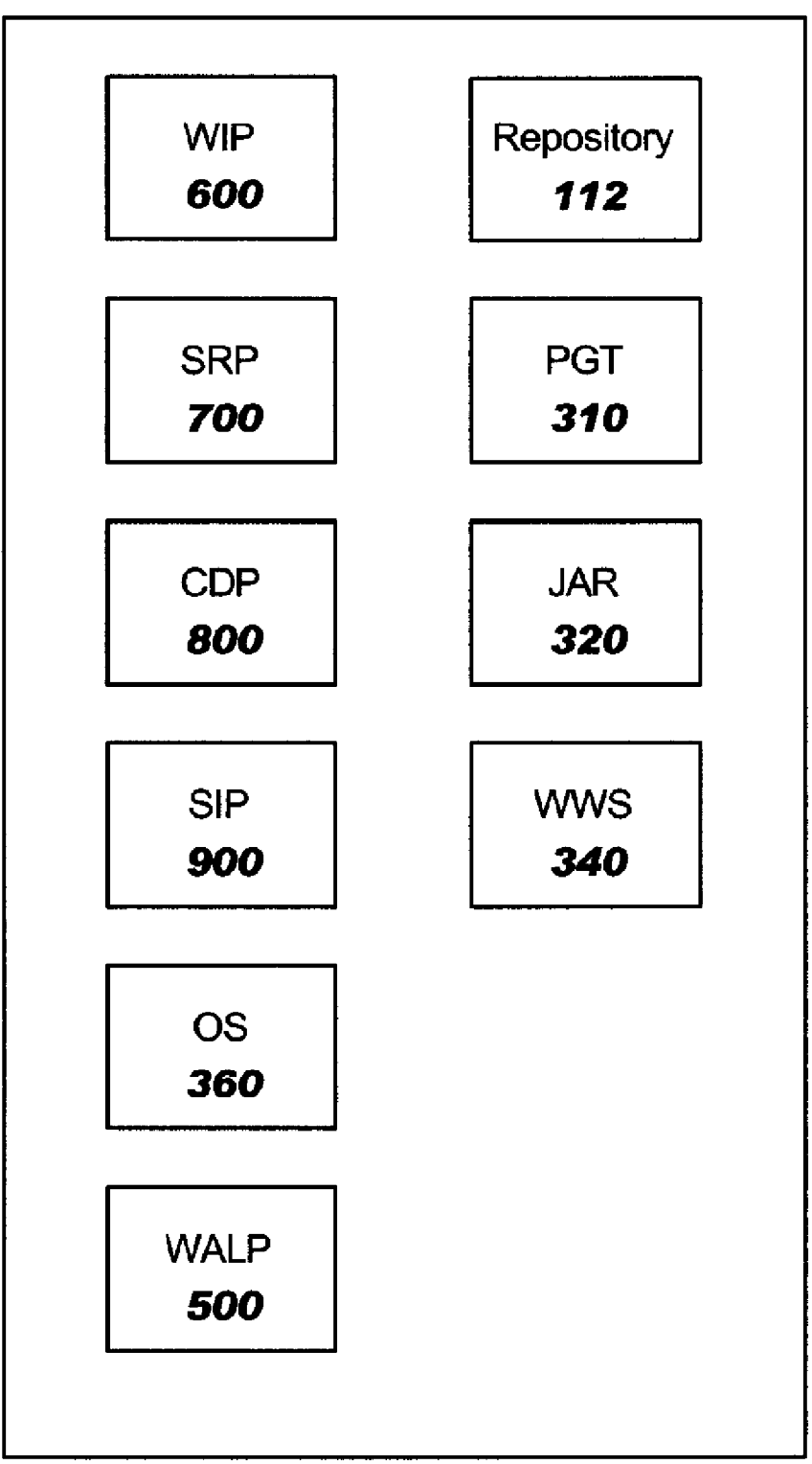
FIG. 3 is a schematic diagram of the storage resource utilized by the WALS.

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and storage; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. A "network" comprises any number of hardware devices coupled to and in communication with each other through a communications medium, such as the Internet. A "communications medium" includes without limitation any physical, optical, electromagnetic, or other medium through which hardware or software can transmit data. The term "memory," as used herein, includes without limitation any volatile or persistent medium, such as an electrical circuit, magnetic disk, optical disk, or storage device in which a computer can store data or software for any duration. A single memory may encompass and be distributed across a plurality of media. The term "register" as used herein, means to enter data or modify data in a repository. The term "storage," as used herein, includes without limitation any memory and any internal or external storage connected to a computer directly or by a network. As used herein, the term "web abstraction layer" means a middleware application.

FIG. 1 depicts an overview of the Web Abstraction Layer (WAL) 110 configured in an exemplary web service network. WAL 110 forms an abstraction layer between the web service clients, depicted as JAVA client A 120, .NET client 130 and JAVA client B 140, and the web services depicted as Web Service 1 150, Web Service 2 152 and Web Service 3 154. JAVA client A 120 has access to a plurality of application interfaces (API) 124 such as JAX-RPC and WSIF. WAL 110 contains repository 112. Without WAL 110, when parameters affecting a client's ability to invoke a web service change, the developer must rewrite and recompile the client code that invokes the web service with the changed parameters. With WAL 110, changes are made in WAL 110, transparent to a client, and a developer does not need to write code for changes in web service information.

FIG. 2 depicts an exemplary data table from repository 112. Repository 112 contains, for each web service registered with WAL 110, Uniform Resource Identifier (URI) 210, description 220, method name 230, input parameters 230, output parameters 260, class name 270, and Web Service WSDL file location 280.

FIG. 3 depicts WAL storage resource (WSR) 300. WSR 300 contains the programs, tools and storage that enable WAL 110 to perform its functions. The programs include WALP 500, WIP 600, SRP 700, CDP 800, and SIP 900. WSR 300 also includes WAL server operating system (OS) 360, repository 112, proxy generator tool (PGT) 310, Java Archive Files (JAR) 320, and WAL WSDL Storage (WWS) 340. PGT 310 generates Generic Abstraction Proxy (GAP) 422 (see FIG. 4 below for an explanation of GAP 422). JAR 320 stores GAP 422. WWS 340 stores WAL WSDL information necessary to create GAP 422.

Figure 4:
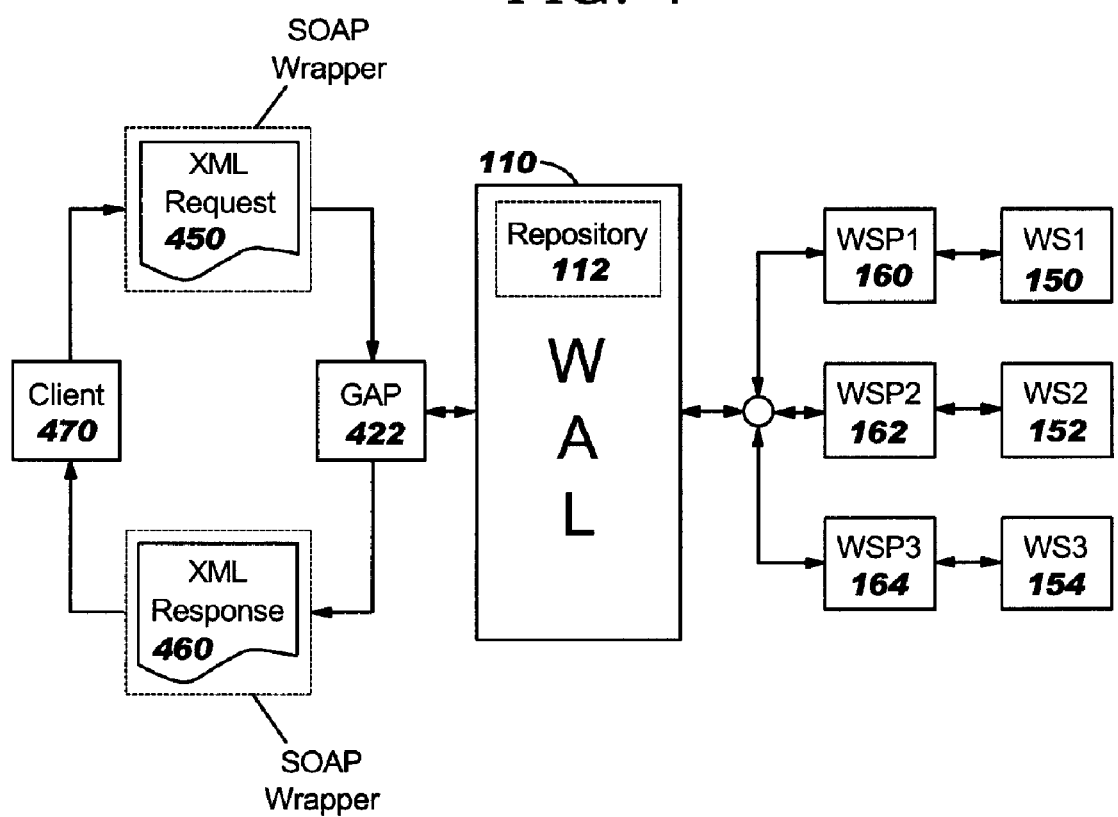
FIG. 4 is an overview of the message transmission system.

FIG. 4 is a schematic representation of the transmission of a request for a web service from a client through WAL 110, and transmission of the response by the web service through WAL 110 to the client. In passing a message through WAL 110 from a client to a web service, two different proxies are used. The first proxy is a generic abstraction proxy (GAP) represented by GAP 422. The second proxy is a proxy specific to a web service, called a web service proxy (WSP). By way of example, FIG. 4 depicts three web service proxies, WSP1 160, WSP 2 162 and WSP3 164 corresponding to three web services, WS1 150, WS2 152 and WS3 154.

Client 470 (representative of clients located throughout an enterprise) sends request 450 to WAL 110 using GAP 422. Client 470 passes request 450 to GAP 422, which in turn, passes request 450 to WAL 110. Once GAP 422 sends request 450 to WAL 110, WALP 500 matches client 470 to the appropriate web service for request 450, and then sends request 450 to the appropriate web service using the appropriate WSP. By way of example, the appropriate web service in this case is WS3 154. When WALP 500 matches client 470 and WS3 154, WALP 500 links request 450 to WSP3 164, the specific web service proxy for WS3 154. WALP 500 uses WSP3 164 to send request 450 to WS3 154. WS3 154 processes request 450 and sends response 460 to WAL 110 using WSP3 164. WAL 110 then sends response 460 to client 470 using GAP 422.

Request 450 and response 460 are shown as XML messages wrapped in the SOAP protocol needed to pass the messages over the Internet using HTTP. The code to wrap the XML message in the SOAP protocol is included in the client code. GAP 422 is not part of the client code, but is a separate programming entity sharing the same programming space as the client code.

Figure 5:
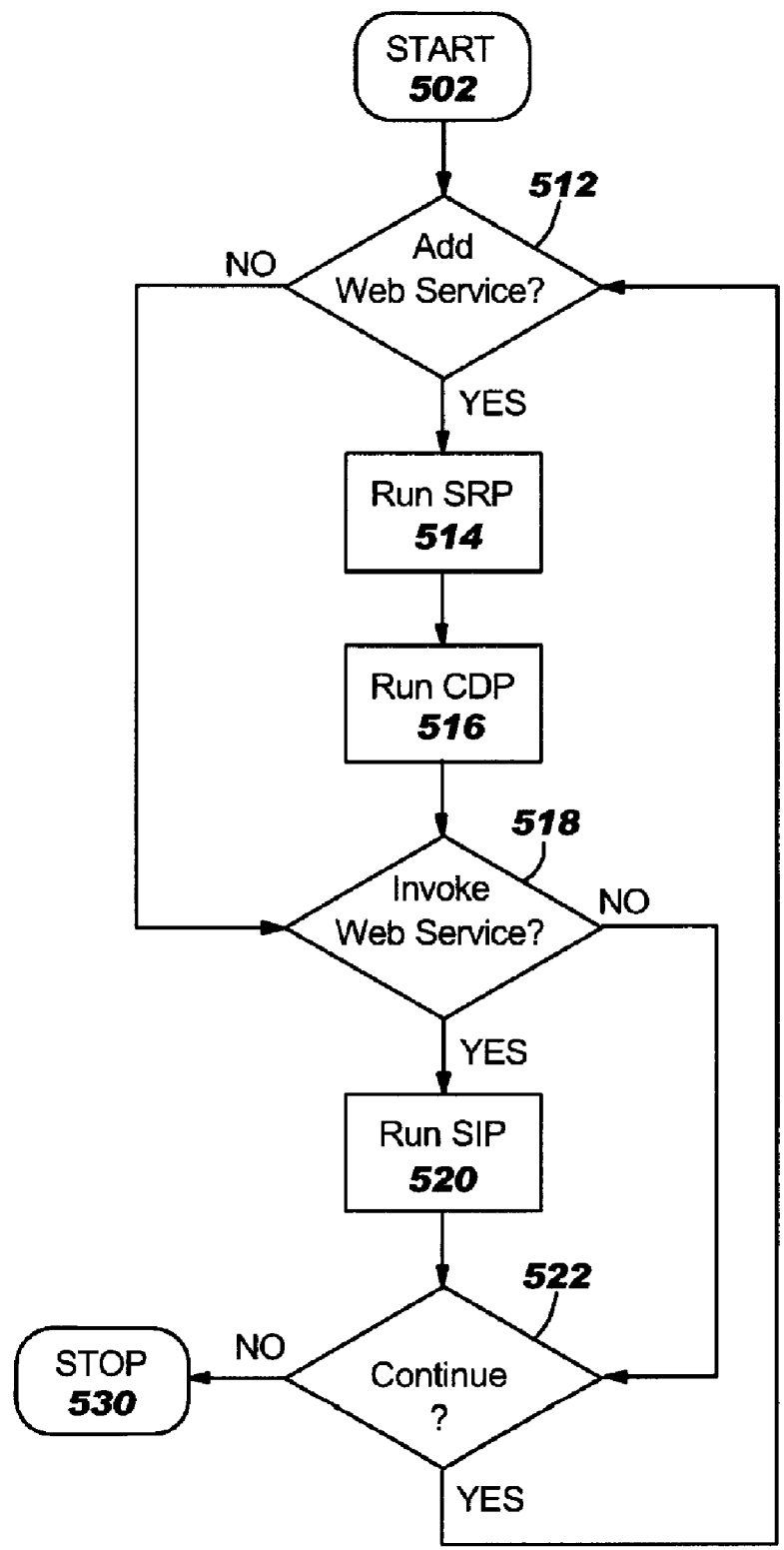
FIG. 5 is a flowchart of the Web Abstraction Layer Program (WALP)

FIG. 5 depicts a flowchart of Web Abstraction Layer Program (WALP) 500. WALP 500 coordinates four programs, WIP 600, SRP 700, CDP 800, and SIP 900. WALP 500 starts (502) and determines whether a web service is to be added (512). If a web service is to be added, WALP 500 will run SRP 700 (514), then run CDP 800 (516) and go to step 518. If a web service is not to be added, then WALP 500 determines whether a web service is to be invoked (518). If a web service is to be invoked, then WALP 500 runs SIP 900 and goes to step 522. If a web service is not to be invoked, WALP 500 determines whether to continue (522). If so, WALP 500 goes to step 512. If not, WALP 500 stops (530).

Figure 6:
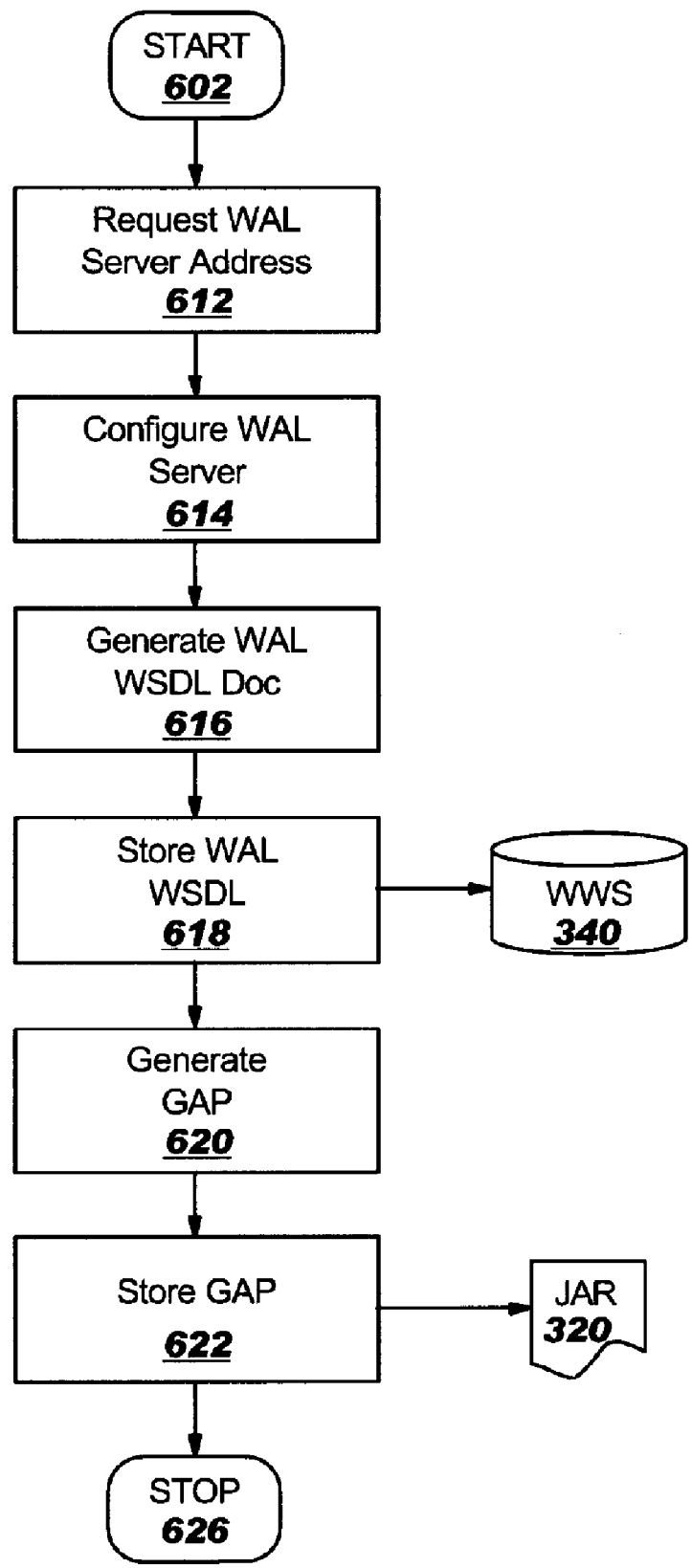
FIG. 6 is a flowchart of the WAL Installation Program (WIP)

FIG. 6 is a flowchart of WAL Installation Program (WIP) 600. WIP 600 requests the WAL server address (612), and configures the WAL server (614). WIP 600 generates a WAL WSDL document (616) and stores the WAL WSDL document in WWS 340 (618). WIP 600 uses PGT 310 to generate GAP 422. GAP 422 contains configuration information from the WAL WSDL document required by the client code to generate GAP 422 and to communicate with WAL 110 at runtime. WIP 600 stores GAP 422 in JAR 320 and stops (626).

Figure 7:
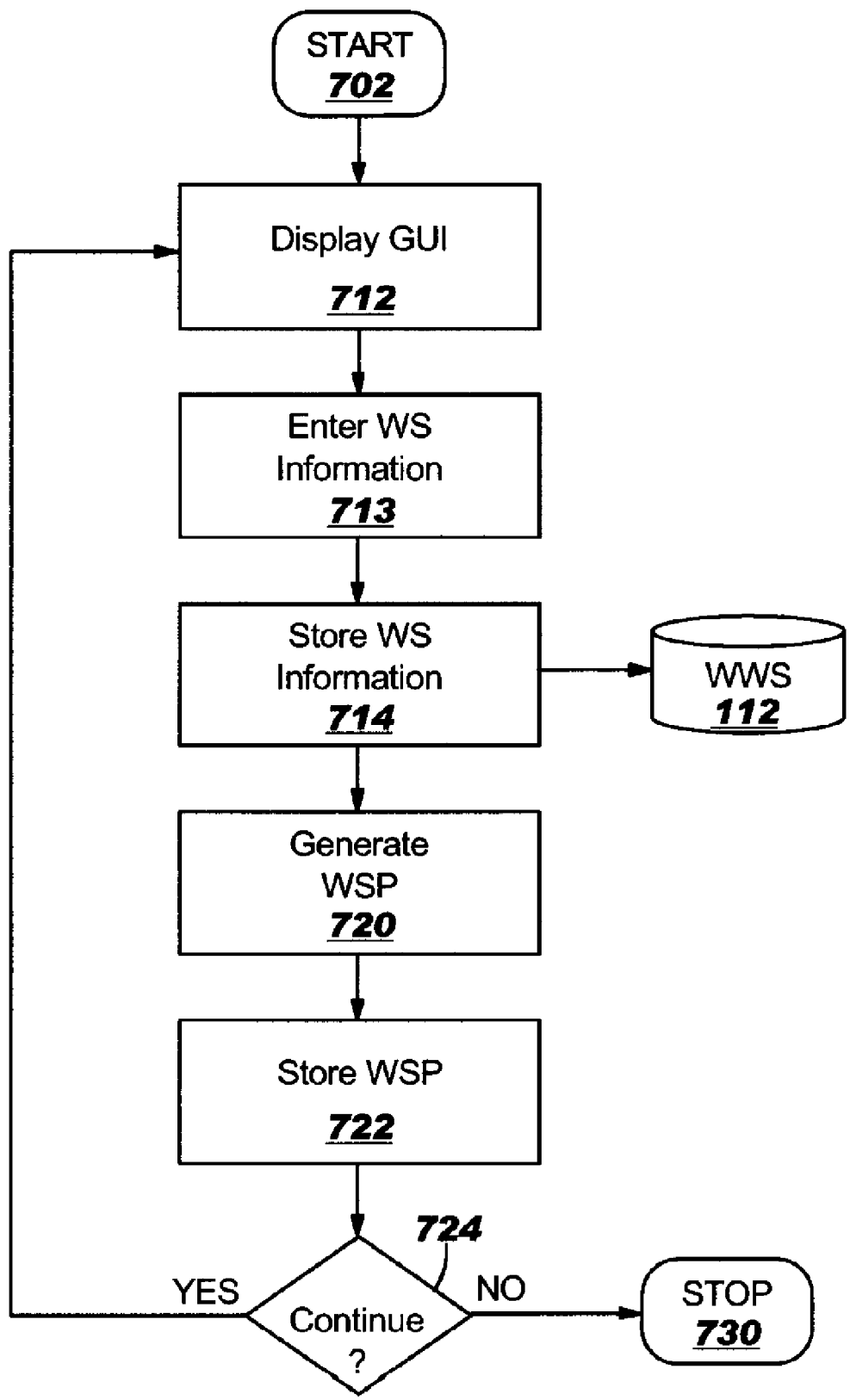
FIG. 7 is a flowchart of the Service Registration Program (SRP)

FIG. 7 is a flowchart of Service Registration Program (SRP) 700. After installation, the developer may either register a new web service, or update information for a previously registered web service. SRP 700 starts (702) and displays a graphical user interface (GUI) (not shown) (712). SRP 700 receives web service information entered by the developer (714). SRP 700 stores the web service information entered at the GUI, including a WSDL document location, for each registered web service in repository 112 (716). SRP 700 uses PGT 350 to generate a WSP from the web service WSDL information stored in repository 112 (720) and stores the WSP (722). SRP 700 determines whether there is another web service to be registered or modified (724). If so, SRP 700 goes to step 714. If there is not another web service to register or modify, SRP 700 stops (730).

Figure 8:
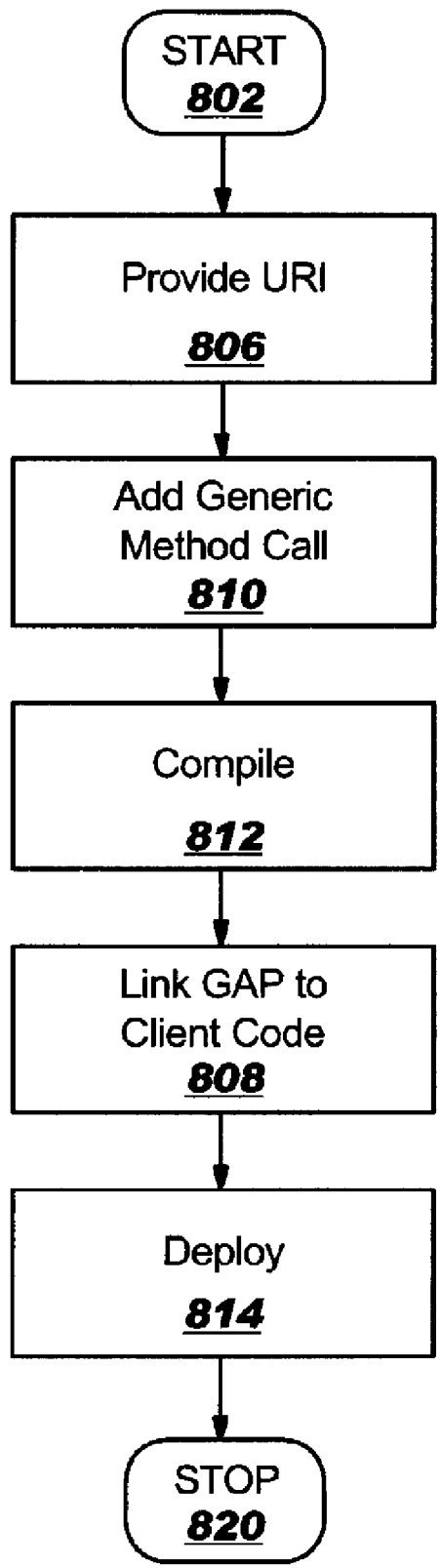
FIG. 8 is a flowchart of the client Code Development Program (CDP)

FIG. 8 is a flowchart of the client Code Development Program (CDP) 800. CDP 800 is employed to develop client code that interacts with WAL 110. The developer specifies the URI (806). CDP 800 retrieves URI 210 from repository 112 (806). CDP 800 adds the generic call method in the client code (810). The generic call method is "callService ( . . . )", wherein the URI and the XML message data are included in the parentheses. XML message data includes the service method's name, input parameters, and output parameters. CDP 800 compiles the client code (812) and links GAP 422 to the client code (808). CDP 800 deploys (814) the client code so that the client may call the web service via WAL 110 and stops (820).

Figure 9:
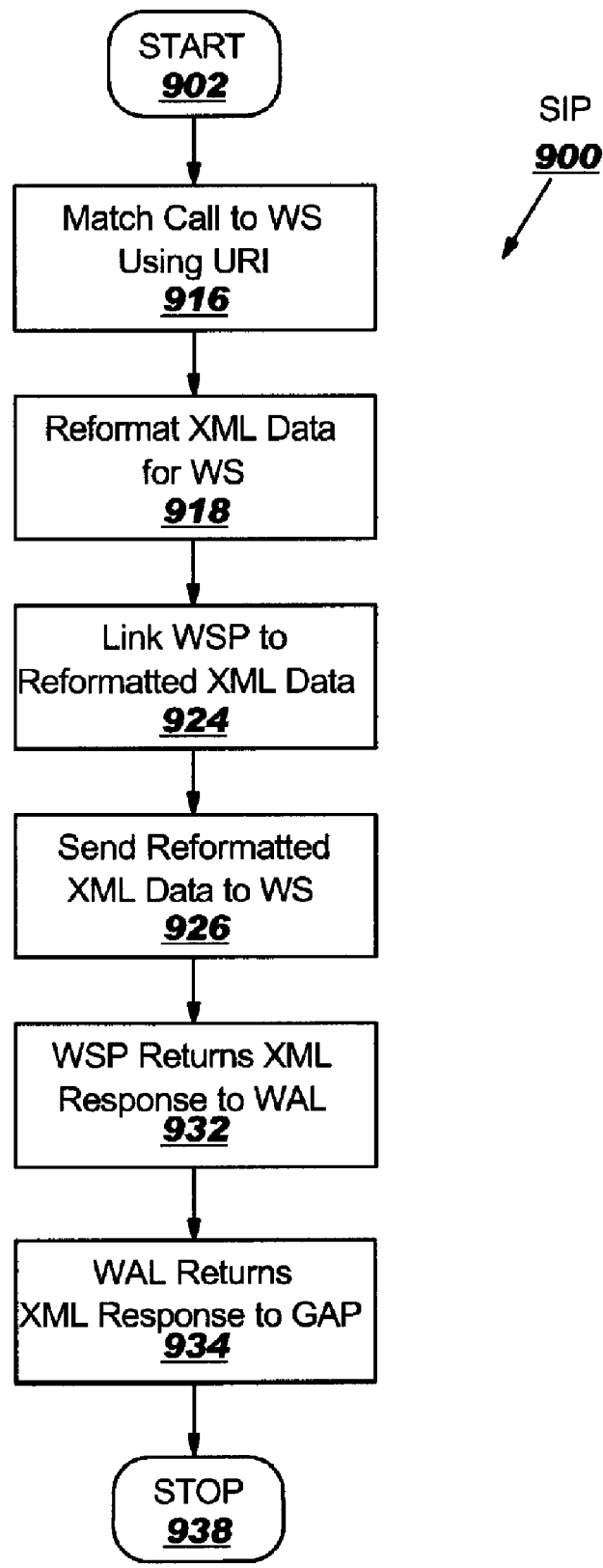
FIG. 9 is a flowchart of the Service Invocation Program (SIP).

FIG. 9 is a flowchart of Service Invocation Program (SIP) 900. When the WAL 110 receives a request for processing, WALP 500 initiates SIP 900. SIP 900 matches the request to the corresponding web service using URI 210 in repository 112 (916). SIP 900 reformats the request to the format used by the web service using WS WSDL file location 280 retrieved from repository 112 (918). WS WSDL file location 280 provides the location of the web service and the protocol required to pass the message. SIP 900 links the appropriate WSP to the reformatted request (924). SIP 900 then sends the reformatted request to the web service (926). Responsive to the web service processing the request (928) and returning a response to WAL 110 (924). WAL 110 passes the response to GAP 422 (934) and stops (938).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process comprising:
  installing a middleware application by performing steps comprising:
    storing an address and a plurality of parameters for each of a plurality of web services in a repository within a layer;
    generating a uniform resource identifier for each of the plurality of web services in the repository;
    storing the uniform resource identifier for each of the plurality of web services in the repository;
    adding a method into a client code such that by calling the method at runtime, the method generates a web service request containing the uniform resource identifier of a desired web service described in the repository and a message to be delivered to the desired web service;
    generating a first proxy containing a plurality of information necessary to relay the web service request to the layer and receive a response from the layer;
    compiling the client code to allow a compiled client code to execute the method at runtime;
    linking the first proxy to the compiled client code to allow the compiled client code to relay the web service request through the first proxy to the layer;
    in response to a change in the address or the plurality of parameters of one of the plurality of web services, updating the address or the plurality of parameters stored in the repository to reflect the change without modifying the compiled client code;
    generating a second proxy that connects the layer with the desired web service, based on a current address of the desired web service as described in the repository;
  using the middleware application by performing steps comprising:
    in response to the execution of the method in the compiled client code, generating the web service request;
    relaying the web service request from the compiled client code to the layer, using the first proxy;
    choosing the desired web service from the repository at the layer, based on the uniform resource identifier contained in the web service request;
    reformatting the request to match a plurality of current parameters of the desired web service as described in the repository;
    transmitting the request from the layer to the desired web service using the second proxy;
    receiving a response from the desired web service at the layer;
    relaying the response from the layer to the compiled client code using the first proxy; and
    wherein the client code need not be changed due to changes in the addresses and plurality parameters of the web services.

* * * * *